UNITED STATES PATENT OFFICE

SAMUEL LEWIS SUMMERS, OF FORT WASHINGTON, PENNSYLVANIA

METHYLENE-DISALICYLIC ACID DERIVATIVE

No Drawing.     Application filed October 12, 1928.  Serial No. 312,199.

My invention relates to organic compounds and their manufacture and is especially concerned with novel condensation products of methylene-disalicyl amide with organic acids such as pyruvic and acetic, as hereinafter described. These substances are useful for pharmaceutical purposes as hereinafter indicated.

The first main step is to convert methylene-disalicylic acid into one of its esters. As the alcohol is removed in the next step the particular nature of the alcohol is of little consequence. One way of esterifying this acid is as follows, though I do not limit myself to this particular method:

Dissolve 288 pounds of methylene-disalicylic acid in 150 pounds of ethyl alcohol and slowly add to this solution, while keeping the temperature at 70° C., a mixture of 60 parts of 66° Bé. sulphuric acid and 40 parts of water. When all has been added, heat for two hours under a reflux condenser to 150° C. The product is freed from sulphuric acid by washing with water. The essential product is the diethyl ester of methylene-disalicylic acid:

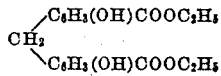

This is a creamy white powder, soluble in alcohol and insoluble in water.

The second main step is to convert this ester into the amide. One method of doing this is as follows:

Mix 344 parts of the diethyl ester (or an equivalent amount of some other ester) of methylene-disalicylic acid with 120 parts of strong ammonia (28%) and heat the mixture in an autoclave at 110° C. for 4 hours. The essential product is methylene-disalicyl amide:

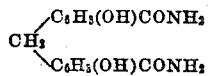

This is purified by washing with water, in which it is insoluble. It is a cream colored powder soluble in alcohol.

The third main step is to introduce acid radicals into the two hydroxyl groups of the above amide, by heating the amide with acids or their anhydrides. A variety of organic acids may be used such as pyruvic, acetic and its homologues. The condensation may be assisted by the addition of mineral acids or other condensing agents. Two examples are given, but I do not limit myself to the particular acids or the exact methods mentioned.

A mixture of 258 parts of methylene-disalicyl amide, 150 parts of pyruvic acid, 60 parts of sulphuric acid 66° Bé. and 40 parts of water is heated 8 hours at 110° C. The reaction product is purified by washing with water. The essential product is dipyruvyl-methylene-disalicyl amide:

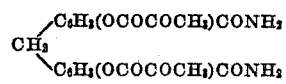

This is a cream colored powder soluble in alcohol but insoluble in water.

To produce the acetylated product a mixture of 258 parts of methylene-disalicyl amide, 150 parts of glacial acetic acid, and 50 parts of 66° Bé. sulphuric acid is heated to 110° C. for 24 hours. The product is purified and freed from uncombined acetic acid and sulphuric acid by washing with cold water after, which it is heated to 90° and mixed (while still hot) with half its volume of benzine, which is allowed to evaporate spontaneously. The essential product is diaceto-methylene-disalicyl amide:

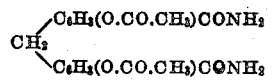

This is a cream colored powder, insoluble in water but soluble in alcohol.

These condensation products of methylene-disalicyl amide with pyruvic and other organic acids, particularly acetic acid and its homologues, are useful as pharmaceutical agents, as systemic antiseptics and for overcoming hepatic insufficiency. They have marked value in the alleviation of pain, fever and inflammation from rheumatism and arthritis and as scavengers of the human organism. The doses may be from 90 to 180 grains per day.

Having thus described my invention, I claim:

1. The hereindescribed condensation product of methylene-disalicyl amide, typified by the formula $$CH_2\begin{cases}C_6H_3(OR)CONH_2\\C_6H_3(OR)CONH_2\end{cases}$$

wherein R may represent the radical of an aliphatic mono carboxylic acid, or hydrogen.

2. The hereindescribed condensation product of methylene-disalicyl amide, typified by the formula $$CH_2\begin{cases}C_6H_3(OR)CONH_2\\C_6H_3(OR)CONH_2\end{cases}$$

wherein R may represent the pyruvyl group, the acetyl group, or hydrogen, insoluble in water but soluble in alcohol.

In testimony whereof, I have hereunto signed my name at Ambler, Pennsylvania, this 9th day of October, 1928.

SAMUEL LEWIS SUMMERS.